US009028968B2

(12) United States Patent
Nixon et al.

(10) Patent No.: US 9,028,968 B2
(45) Date of Patent: May 12, 2015

(54) HIGH SOLIDS EPOXY COATING COMPOSITION

(75) Inventors: Steven Alister Nixon, Whitley Bay (GB); Susan Pritchard, Houghton-le-spring (GB); Adrian Ferguson Andrews, Hexham (GB)

(73) Assignee: Akzo Nobel Coatings International B.V., Arnhem (NL)

( * ) Notice: Subject to any disclaimer, the term of this patent is extended or adjusted under 35 U.S.C. 154(b) by 309 days.

(21) Appl. No.: 12/672,712

(22) PCT Filed: Aug. 7, 2008

(86) PCT No.: PCT/EP2008/060368
§ 371 (c)(1), (2), (4) Date: Apr. 27, 2010

(87) PCT Pub. No.: WO2009/019296
PCT Pub. Date: Feb. 12, 2009

(65) Prior Publication Data

US 2010/0222490 A1 Sep. 2, 2010

Related U.S. Application Data

(60) Provisional application No. 60/968,435, filed on Aug. 28, 2007.

(30) Foreign Application Priority Data

Aug. 9, 2007 (EP) .................................... 07114118

(51) Int. Cl.

| | |
|---|---|
| *B32B 27/38* | (2006.01) |
| *B05D 3/00* | (2006.01) |
| *C08G 59/20* | (2006.01) |
| *C08G 59/24* | (2006.01) |
| *C08G 59/30* | (2006.01) |
| *C08G 59/50* | (2006.01) |
| *C09D 163/00* | (2006.01) |
| *C09D 183/00* | (2006.01) |

(52) U.S. Cl.
CPC ............ *C08G 59/306* (2013.01); *C09D 163/00* (2013.01)

(58) Field of Classification Search
USPC .......... 427/386, 387; 428/413, 414, 416, 418, 428/446, 447, 448, 450; 523/400, 534; 525/474, 476, 523, 524, 525; 528/418, 528/419, 421
See application file for complete search history.

(56) References Cited

U.S. PATENT DOCUMENTS

| | | | | |
|---|---|---|---|---|
| 4,305,979 | A * | 12/1981 | Isarai et al. | 427/386 |
| 4,354,013 | A | 10/1982 | Kimura | |
| 4,926,239 | A | 5/1990 | Fujita et al. | |
| 5,618,860 | A | 4/1997 | Mowrer et al. | |
| 6,525,160 | B1 * | 2/2003 | Goda et al. | 528/29 |
| 6,899,925 | B1 | 5/2005 | Lewin | |
| 2006/0079637 | A1 * | 4/2006 | Yuan | 524/612 |

FOREIGN PATENT DOCUMENTS

| | | | |
|---|---|---|---|
| DE | 1 520 716 | 4/1969 | |
| EP | 1 114 834 | 7/2001 | |
| EP | 1 123 944 | 8/2001 | |
| EP | 1 359 182 | 11/2003 | |
| EP | 1 526 150 | 4/2005 | |
| JP | 54-94600 | 7/1979 | |
| JP | 2002226770 A * | 8/2002 | C09D 163/00 |
| JP | 2005-97405 | 4/2005 | |
| JP | 2005179401 A * | 7/2005 | C08G 59/14 |
| WO | WO 98/46692 | 10/1998 | |
| WO | WO 03/002057 | 1/2003 | |
| WO | WO 2004/058907 | 7/2004 | |

OTHER PUBLICATIONS

Machine translation of JP 2005179401 A, provided by the JPO website (no date).*

Machine translation of JP 2002226770 A, provided by the JPO website (no date).*

ASTM International, Designation: D 3960-05, "Standard Practice for Determining Volatile Organic Compound (VOC) Content of Paints and Related Coatings," *Annual Book of ASTM Standards*, pp. 468-473, Aug. 2005.

ASTM International, Designation: D 5201-05a, "Standard Practice for Calculating Formulation Physical Constants of Paints and Coatings," *Annual Book of ASTM Standards*, pp. 643-648, Jan. 2006.

ASTM International, Designation: D 5895 03, "Standard Test Methods for Evaluating Drying or Curing During Film Formation of Organic Coatings Using Mechanical Recorders," *Annual Book of ASTM Standards*, pp. 697-700, Jul. 2003.

"Method 24-Determination of Volatile Matter Content, Water Content, Density, Volume Solids, and Weight Solids of Surface Coatings," Dec. 23, 1971, pp. 1180-1194.

British Standard, Method of Tests for Paints, "Determination of the Pot-Life of Liquid Systems—Preparation and Conditioning of Samples and Guidelines for Testing,"BS3900, Part A18, 1993, 12 pages.

International Search Report and Written Opinion, PCT International Application PCT/EP2008/060368, mailed Nov. 17, 2008.

Response to Written Opinion, PCT International Application PCT/EP2008/060368, dated Jun. 5, 2009.

International Preliminary Report on Patentability, PCT International Application PCT/ EP2008/060368, mailed Nov. 18, 2009.

* cited by examiner

*Primary Examiner* — Michael J Feely
(74) *Attorney, Agent, or Firm* — Kenyon & Kenyon LLP

(57) ABSTRACT

Coating composition comprising the reaction product of a tetra-alkoxyorthosilicate or a partially condensed oligomer thereof and an epoxy resin containing hydroxyl groups, said coating composition having a solids content of at least 70 vol % and/or a volatile organic content (VOC) not exceeding 250 g/l. This coating composition gives fast curing at ambient and sub-ambient temperatures and an extended pot life.

8 Claims, No Drawings

HIGH SOLIDS EPOXY COATING COMPOSITION

REFERENCE TO RELATED APPLICATION(S)

This application is the U.S. National Phase of PCT/EP2008/060368 filed on Aug. 7, 2008 and claims the benefit of U.S. Provisional Application No. 60/968,435 filed on Aug. 28, 2007.

The present invention relates to a coating composition comprising a silicate-modified epoxy resin.

In this specification, the term “silicate” refers to a compound in which the silicon atoms are only bonded to oxygen atoms, not to carbon atoms.

A silicate-modified epoxy resin is known from EP 1 114 834, which discloses compositions comprising an alkoxy-containing silicon-modified epoxy resin obtainable by dealcoholisation condensation of a bisphenol epoxy resin—i.e. an aromatic epoxy resin—and a hydrolysable alkoxysilane. This composition contains a high level of solvent and, hence, has a low solids content, typically 60 vol % or lower. Further, this composition is cured at high temperatures, typically 135-175° C.

There has been increased concern in recent years about the release of volatile solvents into the atmosphere, and, consequently, there has been a need to reduce the volatile organic solvent content of coating compositions. This has not been easy for coating compositions that have to be applied by spray, roller or brush, and particularly not for coating compositions which have to be applied and cured rapidly at ambient temperature—such as coating compositions for large structures like ships, bridges, buildings, industrial plants, and oil rigs, because they require a relatively low viscosity of below 20 Poise.

Coating compositions generally need to contain a polymer to confer film-forming properties, but any polymer used needs to be of sufficient molecular weight and give the required low viscosity, particularly after pigmentation. Low-viscosity polymers, however, often require long curing times to develop satisfactory mechanical properties, especially when cured at low temperature.

Surprisingly, it has now been found that silicate-modified epoxy resins can be used to formulate high solids coating compositions with fast curing properties at ambient and sub-ambient temperatures.

The present invention relates to a coating composition comprising a reaction product of a tetra-alkoxyorthosilicate or a partially condensed oligomer thereof and an epoxy resin containing hydroxyl groups, said coating composition having a solids content of at least 70 vol % and/or a volatile organic content (VOC) not exceeding 250 g/l.

It is essential for the coating composition to contain the reaction product and not just a blend of the (partially hydrolysed)tetra-alkoxyorthosilicate and the epoxy resin. The reaction product is obtained by reacting the (partially hydrolysed) tetra-alkoxyorthosilicate and the epoxy resin under increased temperature and in the presence of a catalyst, as described below in more detail.

The reaction product of the (partially condensed) tetra-alkoxyorthosilicate and the epoxy resin (further referred to as: the silicate-modified epoxy resin) can have such a low viscosity that an additional solvent is not even required. Furthermore, the coating composition according to the invention has an extended pot life.

In the present specification, the terms “high solids” and “high solids content” refer to solid contents of at least 70% by volume (vol %), more preferably at least 80 vol %, and most preferably at least 85 vol %, based on the total weight of the coating composition. The maximum solids content generally is not higher than 95 vol %. The solids content of the composition can be determined in accordance with ASTM standard D 5201-01.

The Volatile Organic Content (VOC) of the coating composition preferably does not exceed 250 g/l and most preferably is less than 100 g/l solvent per liter of the composition. The VOC level can be measured according to EPA reference method 24 in conjunction with ASTM standard D 3960-02.

The above values refer to those of the complete coating composition. Hence, if the coating composition has the form of a 2-pack composition, they refer to the solids content and the VOC of the composition after mixing both packs.

The tetra-alkoxyorthosilicate and the partially condensed oligomers thereof that can be used to prepare the silicate-modified epoxy resin are represented by the formula:

$$R—O—[—Si(OR)_2—O—]_n—R$$

wherein each R is independently selected from alkyl and aryl groups having up to 6 carbon atoms and $—Si(OR)_3$ groups, and n=1-20.

In a preferred embodiment, R is selected from methyl, ethyl, propyl, isopropyl, and butyl; more preferably, R is ethyl.

Examples of suitable tetra-alkoxyorthosilicates are tetra-methoxyorthosilicate, tetra-ethoxyorthosilicate, tetra-propoxyorthosilicate, tetra-isopropoxyorthosilicate, tetra-butoxyorthosilicate, and partially polymerised/oligomerised forms thereof. A most preferred tetra-alkoxyorthosilicate is a partially oligomerised tetra-ethoxyorthosilicate such as the commercially available tetra-ethoxyorthosilicates TES40 (ex Wacker) and Dynasil 40 (ex Degussa).

The epoxy resin containing hydroxyl groups that can be used in the present invention can be an aromatic or an aliphatic epoxy resin. Preferably, the epoxy resin is an aliphatic epoxy resin. More preferably, a blend of one or more aliphatic and one or more aromatic epoxy resins with hydroxyl groups is used. Silicate-modified aliphatic epoxy resins, silicate-modified blends of one or more aromatic and one or more aliphatic epoxy resins have a lower viscosity than silicate-modified aromatic epoxy resins. Hence, silicate-modified aliphatic epoxy resins, optionally in combination with one or more silicate-modified aromatic epoxy resins, can be used to formulate coating compositions with a lower viscosity and, hence, a higher solids content and a lower VOC than silicate-modified aromatic epoxy resins.

The present invention therefore also relates to silicate-modified epoxy resins obtainable by dealcoholisation condensation of a tetra-alkoxyorthosilicate and a blend of (i) one or more aliphatic epoxy resins containing hydroxyl groups and (ii) one or more aromatic epoxy resins containing hydroxyl groups.

Examples of aliphatic epoxy resins that contain hydroxyl groups include hydrogenated bisphenol A epoxy resins and polyglycidylethers of polyhydric alcohols such as trimethylolpropane triglycidyl ether, pentaerythritol tetraglycidyl ether, dipentaerythritol tetraglycidyl ether, butanediol diglycidyl ether, and hexanediol diglycidyl ether.

Examples of aromatic epoxy resins that contain hydroxyl groups are bisphenol epoxy resins and partially hydrolysed novolac resins. Bisphenol epoxy resins can be obtained by the reaction between bisphenols and haloepoxides such as epichlorohydrin or β-methylepichlorohydrin. Suitable bisphenols can be obtained by the reaction between phenol or 2,6-dihalophenol and aldehydes or ketones such as formaldehyde, acetaldehyde, acetone, acetophenone, cyclohexanone, or benzophenone, by oxidation of dihydroxyphenylsulfide with a peracid, and by etherification of one or more hydroquinones.

The epoxy resin may have been partially reacted with a secondary amine prior to its reaction with the tetra-alkoxyorthosilicate.

The epoxy equivalent of the epoxy resins containing hydroxyl groups is preferably about 180 to about 5,000 g/eq, more preferably 180 to 1,000 g/eq. With an epoxy equivalent below 180 g/eq, the number of hydroxyl groups able to react with the tetra-alkoxyorthosilicate will be too small to give sufficient bonding between the epoxy resin and the tetra-alkoxyorthosilicate. With an epoxy equivalent higher than 5,000 g/eq, the number of hydroxyl groups will be so high that the condensation will be difficult to control and fast gelation may occur.

The silicate-modified epoxy resin is obtainable by dealcoholisation condensation of the (partially hydrolysed) tetra-alkoxyorthosilicate and the epoxy resin containing hydroxyl groups. During the dealcoholisation condensation, part or all of the hydroxyl groups of the epoxy resin react with (partially hydrolysed) tetra-alkoxyorthosilicate.

The weight ratio of epoxy resin to tetra-alkoxyorthosilicate is preferably in the range of 1:10 to 10:1, more preferably 1:1 to 5:1.

Preferably, the ratio of alkoxy groups of the (partially hydrolysed) tetra-alkoxyorthosilicate to hydroxyl groups of the epoxy resin lies in the range of 2:1 to 100:1, more preferably in the range of 3:1 to 50:1, and most preferably in the range of 4:1 to 12:1. A stoichiometric ratio is undesired, because with an epoxy resin having on average more than one hydroxyl group per molecule that could result in the product forming an intractable gel. And although it is possible to use an excess of hydroxyl groups, the resulting product would have high viscosity and would not exhibit fast drying.

The dealcoholisation condensation reaction can be performed by heating, in the presence of a catalyst, a mixture of the epoxy resin and the (partially hydrolysed) tetra-alkoxyorthosilicate. Tetra-alkoxyorthosilicates have very limited compatibility with organic polymers and will phase separate when mixed therewith. This is in contrast to silanes containing one or more Si—C bonds, which have a better compatibility with organic polymers and readily form homogenous mixtures. Upon heating in the presence of a suitable catalyst, some reaction between the hydroxyl groups of the epoxy resin and the orthosilicate takes place, as evidenced by changes in the $^1$H NMR spectrum of the epoxy resin. As the reaction proceeds, the miscibility of the two components improves to such an extent that a single phase homogenous mixture results.

The reaction temperature preferably ranges from 50° C. to 130° C., more preferably from 70 to 110° C. The reaction is preferably conducted for about 1 to about 15 hours and under substantially anhydrous conditions in order to prevent polycondensation reactions of the tetra-alkoxyorthosilicate.

Suitable catalysts for this dealcoholisation condensation reaction are conventionally known catalysts which do not cause ring opening of an epoxy ring. Examples of such catalysts are metals like lithium, sodium, potassium, rubidium, caesium, magnesium, calcium, barium, strontium, zinc, aluminium, titanium, cobalt, germanium, tin, lead, antimony, arsenic, cerium, boron, cadmium, and manganese, their oxides, organic acid salts, halides, or alkoxides. Organotitanium and organotin compounds are preferred catalysts. Even more preferred are dibutyltin dilaurate, and tetra-alkyl titanium compounds.

Base catalysts, such as amines, should however be avoided, because they might directly react with the epoxy groups on the epoxy resin or promote unwanted homopolymerisation reactions of the epoxy groups.

The resulting silicate-modified epoxy resin may contain some unreacted epoxy resin and/or unreacted tetra-alkoxyorthosilicate. The unreacted tetra-alkoxyorthosilicate can be converted to silica by hydrolysis and condensation. To promote the hydrolysis and condensation, a small amount of water may be added to the silicate-modified epoxy resin when used.

The coating composition according to the present invention may have the form of a 1-pack or a 2-pack composition.

A 1-pack composition requires the epoxy resin to have been pre-reacted with a secondary amine prior to its reaction with the (partially hydrolysed) tetra-alkoxyorthosilicate and is moisture curable. Hence, this composition should be substantially free of moisture.

A 2-pack composition will contain a curing agent in a separate pack. Hence, pack 1 will contain the silicate-modified epoxy resin, pack 2 an epoxy-reactive curing agent. Pack 1 is preferably free of bases or other compounds that can react with the epoxy functionalities of the silicate-modified epoxy resin. It is particularly preferred that pack 1 is free of amines. Furthermore, pack 1 should be substantially free of moisture.

"Substantially free of moisture" in this specification means containing less than 1.0 wt %, more preferably less than 0.5 wt %, and most preferably less than 0.1 wt % of water.

The epoxy-reactive curing agent that is present in the 2-pack coating composition can be any curing agent commonly known as a curing agent for epoxy resins. Examples are phenol resin curing agents, polyamine curing agents, polythiol curing agents, polyanhydride curing agents, and polycarboxylic acid curing agents, with polyamine curing agents being preferred. Optionally, the curing agent may comprise an amino-functional organosiloxane that is capable of reacting with both epoxy groups and alkoxysilicate groups.

Examples of phenol resin curing agents are phenol novolac resin, bisphenol novolac resin, and poly p-vinylphenol.

Examples of polyamine curing agents are diethylene triamine, triethylene tetramine, tetraethylene pentamine, dicyandiamide, polyamide-amine, polyamide resin, ketimine compounds, isophorone diamine, m-xylene diamine, m-phenylene diamine, 1,3-bis(aminomethyl)cyclohexane, N-aminoethyl piperazine, 4,4'-diaminodiphenyl methane, 4,4'-diamino-3,3'-diethyl-diphenyl methane, diaminodiphenyl sulfone, and adducts of any of these amines. Such adducts can be prepared by reaction of the amine with a suitably reactive compound such as an epoxy resin. This will reduce the free amine content of the curing agent, making it more suitable for use under conditions of low temperature and/or high humidity.

Examples of polycarboxylic acid curing agents include phthalic anhydride, tetrahydrophthalic anhydride, methyltetrahydrophthalic anhydride, 3,6-endomethylenetetrahydrophthalic anhydride, hexachloroendomethylenetetrahydrophthalic anhydride, and methyl-3,6-endomethylenetetrahydrophthalic anhydride.

The amount of curing agent present in the 2-pack coating composition is preferably such that the equivalent ratio of the functional groups having active hydrogen in the curing agent to the epoxy groups of the silicate-modified epoxy resin is between about 0.2 and 2.

In addition, the 2-pack coating composition may contain an accelerator for accelerating the curing reaction. Examples of suitable accelerators are tertiary amines like 1,8-diaza-bicyclo[5.4.0]undec-7-ene, triethylene diamine, benzyldimethylamine, triethanolamine, dimethylaminoethanol, and tris-(dimethylaminomethyl)phenol; imidazoles like 2-methyl imidazole, 2-phenylimidazole, 2-phenyl-4-methylimidazole, and 2-heptadecylimidazole; organic phosphines like tributyl phosphine, methyldiphenyl phosphine, triphenyl phosphine, diphenyl phosphine, and phenyl phosphine; nonyl phenol; salicylic acid; diazabycyclo octane; calcium nitrate.

The accelerator is preferably used in an amount of 0.1 to 5 parts by weight relative to 100 parts by weight of the silicate-modified epoxy resin.

The accelerator can be present in pack 1 (containing the silicate-modified epoxy resin) and/or pack 2 (containing the curing agent).

The coating composition according to the invention may also contain a compound which acts as a catalyst for Si—O—Si condensation. In general, the coating is capable of curing under ambient temperature and humidity conditions to a tack-free coating in 2 to 20 hours even without such a catalyst, but a catalyst may be preferred to give a faster cure.

One example of a catalyst for Si—O—Si condensation is an alkoxytitanium compound, for example a titanium chelate compound such as a titanium bis(acetylacetonate)dialkoxide, e.g., titanium bis(acetylacetonate)diisopropoxide, a titanium bis(acetoacetate)dialkoxide, e.g., titanium bis(ethylacetoacetate)diisopropoxide, or an alkanolamine titanate, e.g., titanium bis(triethanolamine)diisopropoxide, or an alkoxytitanium compound which is not a chelate such as tetra (isopropyl)titanate or tetrabutyl titanate. Such titanium compounds containing alkoxy groups bonded to the titanium may not act as catalysts alone, since the titanium alkoxide group is hydrolysable and the catalyst may become bound to the cured composition by S—O—Ti linkages. The presence of such titanium moieties in the cured composition may be advantageous in giving even higher heat stability. The titanium compound can for example be used at 0.1 to 5% by weight of the binder. Corresponding alkoxide compounds of zirconium or aluminium are also useful as catalysts.

An alternative catalyst for Si—O—Si condensation is a nitrate of a polyvalent metal ion such as calcium nitrate, magnesium nitrate, aluminium nitrate, zinc nitrate, or strontium nitrate. Calcium nitrate is an effective catalyst for curing a silicate by Si—O—Si condensation when the composition also includes an organic amine. The calcium nitrate is preferably used in its tetrahydrate form, but other hydrated forms can be used. The level of calcium nitrate catalyst required generally is not more than 3% by weight of the binder, for example 0.05 to 3% by weight. Coatings cured using calcium nitrate catalyst are especially resistant to yellowing on exposure to sunlight.

Another example of a suitable catalyst is an organotin compound, for example a dialkyltin dicarboxylate such as dibutyltin dilaurate or dibutyltin diacetate. Such an organotin catalyst can for example be used at 0.05 to 3% by weight, based on the weight of the silicate-modified epoxy resin.

Other compounds effective as catalysts in the coating compositions of the invention are organic salts, such as carboxylates, of bismuth, for example bismuth tris(neodecanoate). Organic salts and/or chelates of other metals such as zinc, aluminium, zirconium, tin, calcium, cobalt, or strontium, for example zirconium acetylacetonate, zinc acetate, zinc acetylacetonate, zinc octoate, stannous octoate, stannous oxalate, calcium acetylacetonate, calcium acetate, calcium 2-ethylhexanoate, cobalt naphthenate, calcium dodecylbenzene sulphonate, or aluminium acetate, may also be effective as catalysts.

The coating composition of the invention may contain one or more further ingredients. It may contain solvents, provided that the solids content is at least 70 vol %. It may also contain one or more pigments, for example titanium dioxide (white pigment), coloured pigments such as yellow or red iron oxide or a phthalocyanine pigment and/or one or more strengthening pigments such as micaceous iron oxide or crystalline silica and/or one or more anticorrosive pigments such as metallic zinc, zinc phosphate, wollastonite or a chromate, molybdate or phosphonate and/or a filler pigment such as barytes, talc or calcium carbonate. The composition may also contain one or more thickening agents such as fine-particle silica, bentonite clay, hydrogenated castor oil, or polyamide wax, one or more plasticisers, pigment dispersants, stabilisers, mould releasing agents, surface modifiers, fire retardants, antibacterial agents, antimoulds, levelling agents, and antifoaming agents, etc.

The coating composition of the invention generally cures at ambient temperatures or even lower, for example −5 to 30° C., and is thus suitable for application to large structures where heat-curing is impractical. The coating composition of the invention alternatively may be cured at elevated temperatures, for example from 30 or 50° C. up to 100 or 130° C., if so desired. The hydrolysis of silicon-bonded alkoxy groups depends on the presence of moisture: in almost all climates atmospheric moisture is sufficient, but a controlled amount of moisture may need to be added to the coating when curing at sub-ambient temperature or when curing in very low humidity (desert) locations. The water is preferably packaged separately from any compound or polymer containing silicon-bonded alkoxy groups.

The coating composition of the invention can be used as finish coatings and/or primer coatings. Coating compositions containing a relatively high proportion of silicates have a high gloss which is retained remarkably well on weathering and UV exposure. They are particularly suitable for coating substrates which are exposed to the weather, e.g. sunlight, for long periods before recoating. The highest levels of gloss may be achieved if the coating composition includes an organic solvent (thinner) such as xylene, although use of solvent is not generally necessary in the coating compositions of the invention. The coating composition may contain an alcohol, e.g. ethanol or butanol, preferably packaged in pack 1, to extend pot life and control initial speed of curing. A finish coating according to the invention can be applied over various primer coatings, for example inorganic zinc silicate or organic zinc-rich silicate primers and organic, e.g. epoxy resin, primers containing zinc metal, corrosion-inhibiting pigments, metal flakes, or barrier pigments. The coating composition of the invention has particularly good adhesion to inorganic zinc silicate coatings without needing an intermediate tie coat or mist coat. A finish coating composition of the invention can also be applied directly over aluminium or zinc "metal spray" coatings, in which case it acts as a sealer as well as a top coat, or over galvanised steel, stainless steel, aluminium, or plastics surfaces such as glass fibre reinforced polyester or a polyester gel coat. The coating composition can for example be used as a finish coating on buildings, steel structures, automobiles, aircraft and other vehicles, and general industrial machinery and fitments. The finish coating can be pigmented or it can be a clear (non-pigmented) coat, particularly on cars or yachts. The coating composition can be applied directly to prepared carbon steel as a primer/finish.

The coating composition of the invention alternatively can be used as a protective primer coating, particularly on steel surfaces, for example bridges, pipelines, industrial plants or buildings, oil and gas installations, or ships. For this use it is generally pigmented with anticorrosive pigments. It may for example be pigmented with zinc dust; coating compositions according to the invention have a similar anticorrosive performance to known zinc silicate coatings but are less liable to mud-cracking and can be readily overcoated, for example with a finish coat according to the present invention. Primer coating compositions according to the invention can be used as maintenance and repair coatings on less than perfect surfaces such as aged blasted steel or “ginger” (steel which has been blasted and has started to rust in small spots), hand-prepared weathered steel, and aged coatings.

As well as having outstanding resistance to UV weathering, the coatings produced from the composition of the invention have good flexibility and adhesion to most surfaces and have high heat resistance, up to 150° C. and usually up to 200° C.

In addition, it should be noted that instead of the tetra-alkoxyorthosilicates, other moisture-reactive species such as titanates can be used to modify the epoxy resins.

EXAMPLES

Example 1

In this Example, a silicate-modified epoxy resin was prepared by reacting a blend of aromatic Bisphenol A-type epoxy resins containing hydroxyl groups with a partially condensed tetra-alkoxyorthosilicate, in the presence of a catalyst.

A partially condensed tetra-alkoxyorthosilicate (TES40) (119.88 g), tetra-n-butyl titanate (0.60 g), and two aromatic Bisphenol A epoxy resins containing hydroxyl groups—DER 331 (376.74 g; a solvent-free liquid resin) and Epikote 836-X-80 (102.78 g; a semi-solid resin containing 20 wt % of xylene)—were charged to a 700 ml reaction flask fitted with a stirrer, a condenser, a thermocouple, and a $N_2$ sparge. The reaction flask was purged with nitrogen for 15 minutes and the reactants were subsequently heated to 100° C. The reaction temperature was maintained at 100° C. for 3 hours before the reaction product was cooled to 40° C. and discharged.

It was observed that the reactants were initially incompatible with each other. However, after 30 minutes at 100° C., the vessel contained a clear, homogenous, and mobile liquid. The viscosity of the resulting liquid was measured to be 12 poise at 25° C. using a Sheen cone and plate viscometer, in accordance with ASTM standard D 4287-00. The solids content, i.e. the non-volatile content, of the liquid ranged between 90 and 92 wt %. The amount of xylene in the liquid was about 3.5 wt %; the amount of ethanol (formed during the reaction) about 1.8 wt %. The remaining non-volatile material was the unreacted volatile component of the silicate.

The viscosities of the starting epoxy resins were (according to their specifications) 110-140 poise for DER 331 and 31-47 poise for Epikote 836-X-80. This demonstrates that silicate-modified epoxy resins have significantly lower viscosities than unmodified epoxy resins.

Examples 2-9

Silicate-modified epoxy resins were prepared according to Example 1. Four different epoxy resins containing hydroxyl groups were used: two Bisphenol A-type aromatic ones (DER 331 and DER 660-X-80) and two aliphatic ones (hexanediol diglycidyl ether (HDDGE) and hydrogenated Bisphenol A diglycidyl ether (Eponex 1510)). The compositions are further specified in Table 1. This Table also displays the viscosity of the resulting resin compositions.

TABLE 1

| Example | Wt % TES40 | Wt % DER660-X-80 | Wt % DER331 | Wt % HDDGE | Wt % Eponex 1510 | Viscosity (Poise) | Solids content (wt %) |
|---|---|---|---|---|---|---|---|
| 2 | 30.0 | 15.0 | 55.0 | | | 7.1 | — |
| 3 | 20.0 | 17.2 | 62.8 | | | 12.0 | 90.48 |
| 4 | 30.0 | | 40.0 | 30.0 | | 0.57 | 86.81 |
| 5 | 25.0 | | 50.0 | 25.0 | | 1.4 | 90.50 |
| 6 | 40.0 | 60.0 | | | | 6.0 | 77.88 |
| 7 | 30.0 | | 50.0 | 20.0 | | 1.2 | 89.10 |
| 8 | 20.0 | | | | 80.0 | 3.4 | 94.68 |
| 9 | 20.0 | | | 20.0 | 60.0 | 1.2 | 91.38 |

It is clear from these Examples that it is possible to produce epoxy silicates which have exceedingly low viscosities, without added solvents. The best results are obtained when using aliphatic epoxy resins or blends of aliphatic and aromatic epoxy resins.

Examples 10-19

The silicate-modified epoxy resins of Examples 3-9 and some additional ones (prepared from the epoxy resins depicted in Table 2 according to the method of Example 1) were mixed with a cycloaliphatic amine curing agent. In all Examples, the same curing agent was used, which was formulated such that the ratio of epoxy groups to active hydrogens was 1:1. A tertiary amine catalyst, DBU (1,8-diazabicyclo[5.4.0]undec-7-ene), was added at a constant mole ratio. The resulting coating compositions were applied onto a surface. They cured rapidly at low temperature. The VOC of all these coating compositions was below 250 g/l and the solids content above 70 vol %.

The mix viscosities and the cure time at 10° C. are tabulated in Table 2. The mix viscosity at 25° C. is reported in poise. The cure time is defined as the time to achieve stage III as described in ASTM D 5895-03; this is equivalent to the “Dry Hard Time”.

TABLE 2

| Example | Epoxy resin | epoxy resin (g) | curing agent (g) | catalyst (g) | Solids content (vol %) | mix viscosity (poise) | cure time (hrs) |
|---|---|---|---|---|---|---|---|
| 10 | DER 331 | 18.7 | 8.30 | 0.50 | | 106.2 | 6 |
| 11 | Epikote 836-X-80 | 31.2 | 8.30 | 0.50 | 82.8 | 134.2 | 13 |
| 12 | Eponex 1510 | 22.4 | 8.30 | 0.50 | | 32.0 | 12 |
| 13 | HDDGE | 14.9 | 8.30 | 0.50 | | 1.9 | 18 |
| 14 | Example 3 | 26.79 | 8.30 | 0.50 | 97.1 | 29.3 | 2 |
| 15 | Example 5 | 23.11 | 8.30 | 0.50 | | 4.6 | 1 |
| 16 | Example 6 | 66.23 | 8.30 | 0.50 | 88.35 | 12.3 | 1 |
| 17 | Example 7 | 25.06 | 8.30 | 0.50 | | 4.2 | 1 |
| 18 | Example 8 | 28.00 | 8.30 | 0.50 | | 8.0 | 1 |
| 19 | Example 9 | 24.87 | 8.30 | 0.50 | | 3.9 | 3.5 |

Example 20

The pot life of the coating composition of Example 14 was determined according to ISO 9514:1992, by measuring the increase in viscosity of the composition as a function of time. The pot life is exceeded once the viscosity of the mixture is greater than that which will allow spray application. The viscosity was measured at 25° C. in accordance with ASTM standard D 4287-00, using a Sheen cone and plate viscometer.

The pot life of this coating composition was 1.5-2 hrs.

Example 21

A single pack silicate-modified epoxy resin was prepared by first pre-reacting an aromatic Bisphenol A-type epoxy resin containing hydroxyl groups—DER 331, (374.0 g)—with a stoichiometric amount of dibutylamine (258.0 g) by (i) adding the epoxy resin to a 700 ml reaction flask fitted with a stirrer, condenser, thermocouple, and $N_2$ sparge, (ii) raising the temperature to 100° C., (iii) adding dibutylamine over a period of three hours, and (iv) cooling the reaction product to 40° C.

The resulting DER331-dibutylamine adduct (210.7 g), a partially condensed tetra-ethoxyorthosilicate—TES40 (217.0 g)—and a tetra-n-butyl titanate catalyst (0.40 g) were charged to a 700 ml reaction flask fitted with a stirrer, condenser, thermocouple, and $N_2$ sparge. The mixture was heated to 100° C., maintained at this temperature for 3 hours, and then cooled to 40° C., after which the reaction product was discharged.

The reactants were initially incompatible with each other. However, after 30 minutes at 100° C., the vessel contained a clear liquid. The resulting material was a clear, homogenous, mobile liquid with a viscosity of 6.6 poise at 25° C.

A sample of the resulting material, with no further curing agent or catalyst, was cast onto a glass panel and its cure time (Stage III) was measured in accordance with ASTM D 5895-03, which is equivalent to the "Dry Hard Time". A drying time of 2 hours 45 minutes was recorded at 10° C.

The invention claimed is:

1. A moisture curable 1-pack coating composition comprising a reaction product of (a) a tetra-alkoxyorthosilicate or a partially condensed oligomer thereof and (b) a pre-reacted adduct of a secondary amine and one or more epoxy resins containing hydroxyl groups, wherein the one or more epoxy resins containing hydroxyl groups are selected from one or more aliphatic epoxy resins containing hydroxyl groups and one or more aromatic epoxy resins containing hydroxyl groups; wherein the 1-pack coating composition has a solids content of at least 70 wt %, a volatile organic content (VOC) not exceeding 250 g/l or a combination thereof; and wherein the 1-pack coating composition is curable at a temperature of −5 to 30° C.

2. A process for coating a substrate comprising: (i) applying the moisture curable 1-pack coating composition according to claim 1 on a substrate and (ii) curing the applied coating composition at a temperature of −5 to 30° C. to form a tack-free coating.

3. A coated substrate obtained by the process according to claim 2.

4. The moisture curable 1-pack coating composition according to claim 1, having a viscosity of less than 20 poise at 25° C.

5. The moisture curable 1-pack coating composition according to claim 4, having a viscosity of less than 6 poise at 25° C.

6. A 2-pack coating composition comprising a first and second pack; said first pack comprising a reaction product of: (a) a tetra-alkoxyorthosilicate or a partially condensed oligomer thereof and (b) a blend of epoxy resins containing hydroxyl groups; said second pack comprising a curing agent; wherein the blend of epoxy resins containing hydroxyl groups comprises one or more aliphatic epoxy resins containing hydroxyl groups and one or more aromatic epoxy resins containing hydroxyl groups, wherein the 2-pack coating composition has a solids content of at least 70 wt %, a volatile organic content (VOC) not exceeding 250 g/l or a combination thereof; and wherein the 2-pack coating composition is curable at a temperature of −5 to 30° C.

7. A process for coating a substrate comprising: (i) combining the first and second packs of the 2-pack coating composition according to claim 6; (ii) applying the resulting composition on a substrate; and (iii) curing the applied composition at a temperature of −5° C. to 30° C. to form a tack-free coating.

8. A coated substrate obtained by the process according to claim 7.

* * * * *